US007979065B1

(12) United States Patent
Lake et al.

(10) Patent No.: US 7,979,065 B1
(45) Date of Patent: Jul. 12, 2011

(54) SYSTEM AND METHOD FOR FACILITATING MULTI-MEDIA COMMUNICATION

(75) Inventors: Joseph E. Lake, Portland, OR (US);
Brian Nelson, Omaha, NE (US); Dan Ulrich, Omaha, NE (US)

(73) Assignee: CSG Interactive Messaging, Inc., Omaha, NE (US)

( * ) Notice: Subject to any disclaimer, the term of this patent is extended or adjusted under 35 U.S.C. 154(b) by 929 days.

(21) Appl. No.: 11/810,607

(22) Filed: Jun. 6, 2007

(51) Int. Cl.
*H04W 4/00* (2009.01)

(52) U.S. Cl. .......... 455/426.1; 455/426.2; 455/466; 455/405; 455/406; 379/39; 379/52; 379/88.14; 370/353; 370/466; 370/352

(58) Field of Classification Search ........... 455/426.1, 455/426.2, 466, 405, 406, 416–417, 426; 379/39, 52, 88.14, 93.7; 370/353, 466, 401, 370/352

See application file for complete search history.

(56) References Cited

U.S. PATENT DOCUMENTS

| 5,515,425 A * | 5/1996 | Penzias et al. ........... 379/114.02 |
| 6,181,736 B1 * | 1/2001 | McLaughlin et al. ........ 375/222 |
| 6,542,582 B1 * | 4/2003 | Smith, Jr. ........................ 379/52 |

* cited by examiner

Primary Examiner — Kamran Afshar
Assistant Examiner — Manpreet Matharu
(74) Attorney, Agent, or Firm — Holland & Hart LLP

(57) ABSTRACT

A system and method are provided with a computing system, capable of binding SMS, voice and other media transactions into a continuous, stateful messaging process that maintains awareness of the communications event over time delays and media transitions. Communications events between two or more communicators over one communications medium are bridged by the system to a second communications medium, according to the needs of the communicators. Various applications of the system permit selective or automated bridging of the communications event based on predetermined events and timeline formulae.

27 Claims, 2 Drawing Sheets

SYSTEM AND METHOD FOR FACILITATING MULTI-MEDIA COMMUNICATION

BACKGROUND

"Text messaging", or Short Message Service (SMS), is the method by which cellular telephone and computer users send brief messages, usually consisting of short text strings and, in some cases sounds, graphics or photos. SMS has become ingrained as a part of life for many. Some have come to "need" SMS to manage their personal and business lives.

However, SMS alone has a number of shortcomings. SMS depends on a network layer protocol known as SMPP, or Simple Message Peer-to-Peer protocol. SMPP is stateless, meaning that each message sent is a complete transaction in itself. In its native form, the protocol has no awareness or persistence regarding extended transactions. Contrast this with a voice call, for example, which is stateful, meaning that as long as both phones are off the hook, there is a persistent connection that can be used by either party, and has internal continuity. Another common complaint about SMS is its inefficient delivery structure. When the SMS message center is overloaded, messages take longer to reach their destination. This creates an inherent inefficiency in the conversation, which can become more than a simple inconvenience in an emergency or even a simple business transaction. Moreover, SMS fails to provide a necessary fluidity in the transmission of information afforded by other media, such as voice calls. When issues in an SMS transaction arise, it is frequently necessary to terminate the communications event and attempt to initiate contact between the parties over a second medium. However, due to the stateless nature of SMS, the transition between media and communications events is cumbersome and can produce unwanted delays, as well as repetitive gathering or exchange of data between communicating parties.

Accordingly, what is needed is a new system and method, capable of binding SMS, voice and other media transactions into a continuous, stateful messaging process that maintains awareness of the communications event over time delays and media transitions.

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A system and method is generally provided for facilitating multi-media communications between at least a first communicator and a second communicator. A communications event is first initiated between the first communicator, operating a first communications device, and a second communicator, operating a second communications device, via a first communications medium. Information and/or data is transmitted between the communications devices during the communications event. At some point during the communications event, based on the needs of the communicators, the communications event is bridged from the first communications medium to a second communications medium. Examples of communications media, from which the first and second communications media may be selected, include a text messaging service, voice call, e-mail, or facsimile transmission.

It is therefore a principal object of the present invention to provide a system and method of facilitating multi-media communications in a manner that binds SMS, voice and/or other media transactions into a continuous, stateful messaging process that maintains awareness of the communications event over time delays and media transitions.

A further object of the present invention is to provide a system and method of facilitating multi-media communications in a manner that provides the convenience and full service of an on-demand voice call.

Still another object of the present invention is to provide a system and method of facilitating multi-media communications that inverts the normal dynamic of inbound and outbound calling, permitting businesses to initiate contact as needed, while allowing consumers to respond on their own schedule.

These and other objects of the present invention will be apparent after consideration of the Detailed Description and Figures herein.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 1:
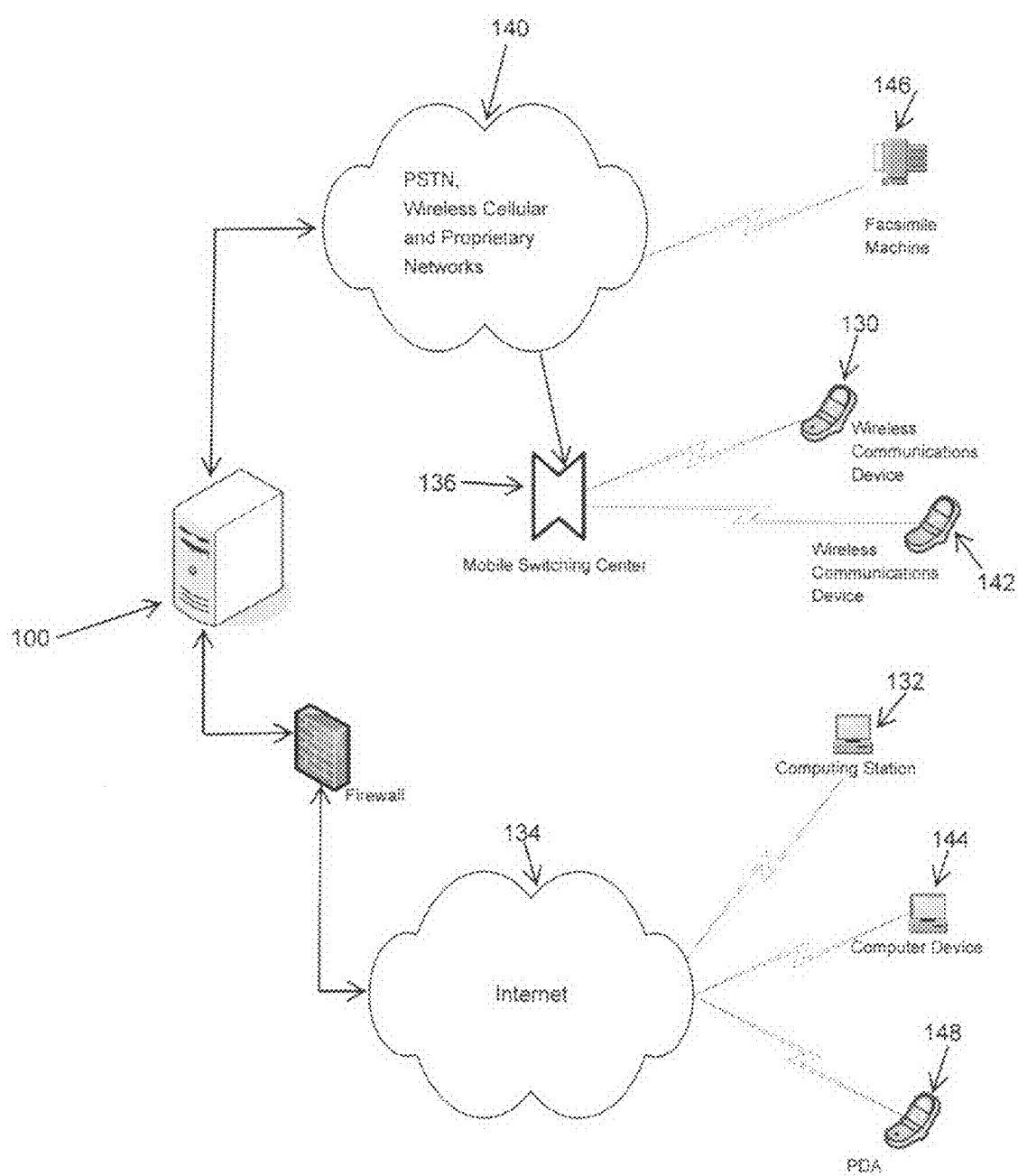
FIG. 1 is a system diagram of one preferred embodiment of a multi-media communications system of the present invention.

FIG. 1 illustrates an example of a suitable system environment on which the present invention may be implemented. Wireless devices, such as a cell phone 130, a computer 132 connected to the Internet 134, or other similar device, may be used for generating short messages, voice calls, facsimile transmissions, e-mails and the like. In the example of a short message session, the short message may originate from a cell phone 130 and be received by a mobile switching center 136 via a wireless medium 138. The mobile switching center 136 then transmits the short message to a computing device 100 (serving in this example as a short message service center) through a network 140, which may be comprised of a public switched telephone system (PSTN), wireless cellular, and other such networks, including various proprietary networks. Computing device 100 then routes the short message to the appropriate mobile switching center 136, which then transmits the short message to a destination device 142. While a single mobile switching center is shown in FIG. 1, many instances may require the use of multiple mobile switching stations to properly route the short message to its destination device. Other common pieces of equipment, such as one or more base stations, are not shown for simplicity. However, the use of such common components will be understood by those of skill in the art and are, therefore, not necessary to describe for purposes of disclosing the present invention. Contemplated examples of the first communications device and second communications device include, but are not limited to: wireless and land-line telephones; computer devices 144 (portable and station positioned); facsimile machines 146; portable electronic devices, such as PDAs 148; and other similar devices. Similarly, contemplated examples of the first communications medium and second communications medium include, but are not limited to: a text messaging service; voice call; e-mail; or facsimile transmission.

Figure 2:
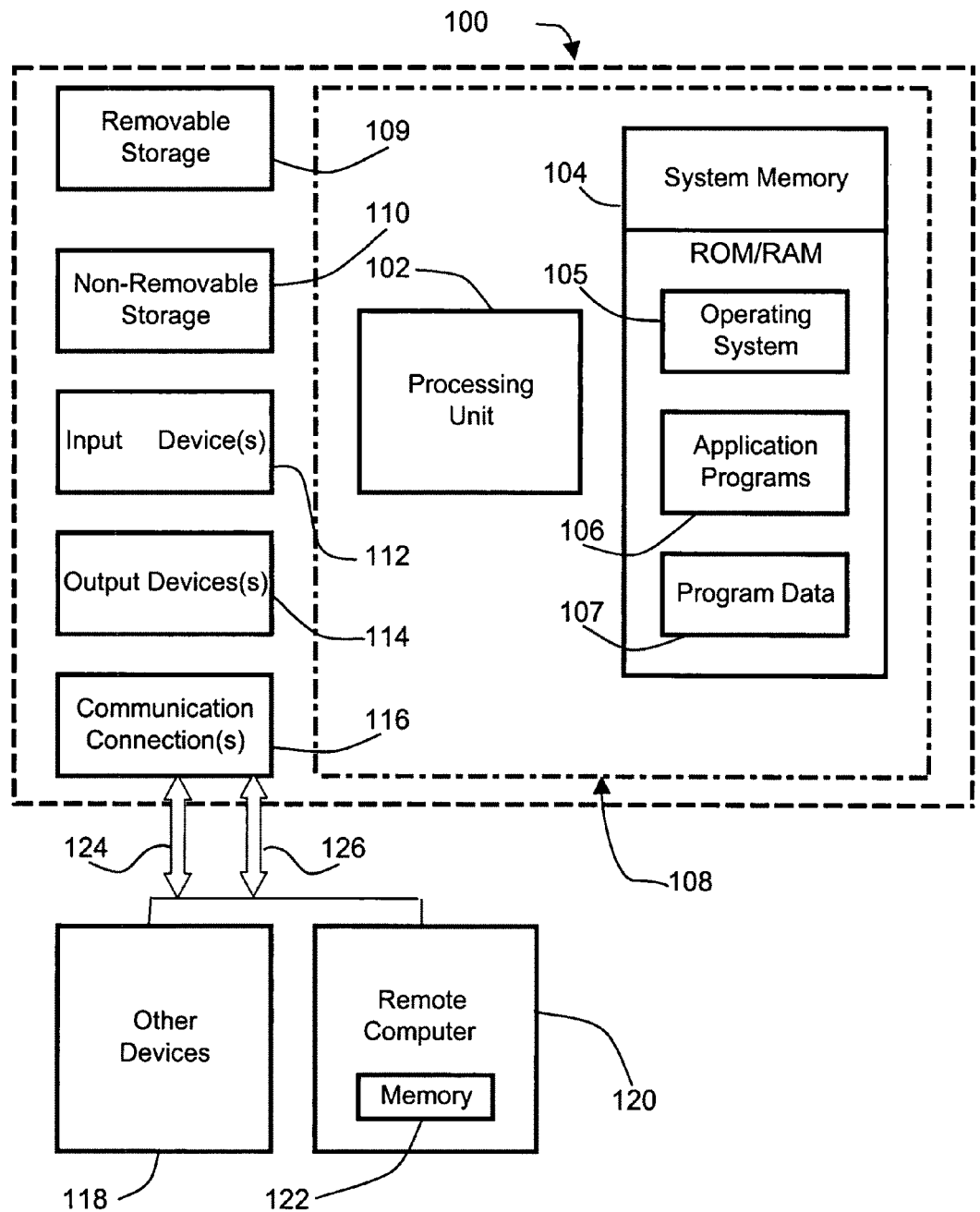
FIG. 2 is a functional block diagram of a computing system adapted to implement an embodiment of the present invention.

FIG. 2 illustrates an example of one preferred configuration of the computing device 100 on which the present invention may be implemented. The computing device 100 is only one example of a suitable computing environment and is not intended to suggest any limitation as to the scope of use or functionality of the invention. Neither should the computing device 100 be interpreted as having any dependency or requirement relating to any one or combination of components illustrated in the exemplary operating environment. The invention is operational with numerous other general purpose or special purpose computing system environments or configurations. Examples of well known computing systems, environments, and/or configurations that may be suitable for use with the invention include, but are not limited to, personal computers, server computers, network PCs, minicomputers, mainframe computers, distributed computing environments that include any of the above systems or devices, and the like.

In a basic configuration, computing device 100 typically includes at least one processing unit 102 and system memory 104. Depending on the exact configuration and type of computing device, system memory 104 may be volatile (such as RAM), non-volatile (such as ROM, flash memory, and the like) or some combination of the two. System memory 104 typically includes operating system 105, one or more application programs 106, and may include program data 107. Examples of application programs 106 include phone dialer programs, e-mail programs, scheduling programs, Internet browser programs, and so forth. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as a keyboard, mouse, pen, voice input device, touch input device, etc. Output device(s) 114 such as a display, speakers, printer, etc. may also be included. All these devices are known in the art and need not be discussed at length here.

Computing device 100 may contain communication connection(s) 116 that allow the device to communicate with other devices 118 (including printing devices, stand alone e-mail servers, facsimile devices, and the like), such as over a network or a wireless mesh network. Communication connection(s) 116 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The computing device 100 may operate in a networked environment using logical connections to one or more remote computers, such as a remote computer 120. The remote computer 120 may be operated by a client, consumer or third-party service provider (including one or more providers of various information databases, research tools, reporting services, and the like); may take the form of a personal computer, a server, a router, a network PC, PDA, a peer device, or other common network node; and typically includes many or all of the elements described above relative to the computing device 100. It is further contemplated, however, that the remote computer 120 could be provided in the form of a telephone, which includes cellular telephones, landline telephones and the like. The logical connections depicted in FIG. 2 include a local area network (LAN) 124 and a wide area network (WAN) 126, but may also include other networks, such as wireless networks, a PSTN, and the like. It will be appreciated, however, that the network connections shown are exemplary and other networking and communications means may be used.

In use, generally, a communication event is initiated between a first communicator, operating a first communications device such as the cell phone 130, and a second communicator, operating a second communications device such as the destination device 142, via a first communications medium such as SMS. Application program 106 on computing device 100 is provided to selectively bridge the communications event, at a user defined point during the communications event, from the first communications medium to a second communications medium, such as a voice call. The types of communications devices and communications media used, as well as the operational setting in which they are used, are variable as discussed previously. It is merely important for computing device 100, to maintain a state of awareness across the communications media.

In one specific application, the system could be used to provide for rate-optimized communications. In such an example, the first communicator uses its cell phone to send a text message to the second communicator, indicating the first communicator would like to be connected to a third party. Based on prior registration data provided by the first communicator, the computing device 100 is aware of the first communicator's preferred calling times in accordance with the cell phone service plan and/or telecommunications charges of the first communicator and/or the third party. This will be particularly relevant where, for example, the cell phone service plan provides for free inbound calling during certain hours. The computing device 100 waits for the preferred time, then bridges a voice call to the first communicator and the desired third party number. Optionally the computing device 100 may message the third party to confirm time and call availability.

The system will also be useful for credit card drop-outs, for example, during an agent supported customer service call, where a consumer is asked to give a credit card number. Such scenarios can pose a risk to the consumers privacy or security, due to the possibility of the call being monitored or fraudulent behavior on the part of the customer service agent. The computing device 100 in this instance transitions the session state from voice to SMS/text messaging, to allow the consumer to message their credit card number privately and securely to the computing device 100. The computing device may be provided to separately validate the credit card number and alert the customer service agent that the number has been entered and processed. If it is necessary, or otherwise desired by the consumer or the customer service agent, the computing device 100 can restore the voice connection through a second bridging event. This significantly reduces the likelihood of fraud in the transaction, protecting the consumer, while the text message transaction history provides a second method of authentication for the business accepting the credit card payment.

In another application, the system may be used to provide time-delayed transaction updates. Specifically, the computing device 100 may be provided to support transactions such as loan approvals, lengthy customer service transactions and the like, where the consumer would ordinarily be required to remain on hold for extended periods, or be available to take a call back. Instead, the consumer can selectively direct the computing device 100 to bridge the communications event from a voice call to a short message session. The consumer may then send a text message comprising the consumer's cell phone number. When an update or resolution becomes available within the transaction's business process, the consumer receives a text message on their cell phone, with the option of replying via text message or requesting that the communications event be bridged back to a voice call, transferring the consumer to a customer service agent. Preferably, the computing device 100 would bridge the call, prompting the customer service agent with relevant information such as loan application number or case number.

In a similar application, the system may be used in the management of hold queues, such as those experienced in customer service applications. More specifically, once the consumer is in a hold queue, the consumer may elect to provide a text messaging capable cell phone number. When the queue management routine determines that the customer's hold time has dropped below a given threshold, typically three to five minutes, the computing device 100 messages the customer that their call is almost ready to be bridged. If the customer does not agree (via text messaging) to be bridged, the consumer drops back in the hold queue. If the consumer does agree (via text messaging) to be bridged, the computing device 100 bridges the communications event to a voice call and connects the consumer with an agent. This increases consumer satisfaction by sharply reducing off-hook hold time, while freeing up costly toll free lines and thus reducing costs to the business.

The system of the present invention also lends itself to consumer satisfaction survey applications. Businesses often survey customers after a transaction to establish satisfaction metrics or proactively take remedial action in the event of an inappropriate or misdirected experience. Text messaging can be used to initiate a simple survey of less than five questions. The computing device 100 may be provided to bridge the communications event to a voice call and connect the customer with an agent for immediate resolution, if the consumer's text message reports a problem with their transaction.

In another application, the present system may be adapted to provide emergency notifications with conference bridging. Emergency notification applications typically support multiple voice numbers via a "hunt group." The present system allows integration of text messaging into the emergency notification process, which can be valuable in the event of physical disasters such as fires, hazardous materials incidents or terrorist attacks. In use, a cell phone user can respond to the emergency message via text messaging, or request bridging into a emergency management conference call. This bridging can be further combined with digital recording and replay to ensure that all call participants receive an initial recorded briefing before entering ongoing discussions.

Still another application of the present system provides for dynamic data querying. The system permits consumers to send queries via text messaging, for example, "Kopykos 97202" to look for a copy center in the 97202 zip code. The computing device 100 may be provided to query dynamic data, such a geographic or other information, and offer responses via text messaging or via voice call back. For example, a bridge to the location of the business being sought, or information better provided via callback such as driving directions.

Data input confirmation is another application that is well suited for the system of the present invention. The system provides a channel for confirming data input via Web, email or IVR, where consumers or companies may want to confirm a key data point, such as a password security question. When the consumer enters the data via another channel, the computing device 100 may be provided to send a text message to their cell phone, asking them to confirm the data element. In the event of questionable customer activity, such as a fraudulent password change attempt, this allows the consumer to deny the change and immediately launch remedial action, typically by having the system bridge the consumer to a customer service contact center.

In still another preferred embodiment, the present system effectively eliminates revalidation, through case number tracking. A common problem in calls with time delays over multiple hours or days, such as call backs on customer service trouble tickets, is the delay and annoyance to the consumer of revalidating their identity and their case number to the contact center. At the end of call where an open case is in effect, the computing device 100 may be provided to send a text message to the consumer's cell phone which contains the case number. When the consumer is ready to call back, they can simply reply the case number. The computing device 100 will associate the case number with the prior history, bring the agent on to the call, and bridge back to the consumer. In this manner, the consumer comes on to the call with a prepared agent, and does not have to walk through the revalidation process.

Yet another aspect of the present invention aids in extending the reach of "agent on demand" contact center processes. Currently, "Agent on Demand" contact center processes require that the overflow agents made available during certain shifts or hours be near their home telephones and workstations. The present system enables tracking and engagement of agents on demand in any situation, where they can respond within a given time window to an availability query via text messaging, and immediately accept the consumer call via a bridge from the computing device 100 to their cell phone.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

What is claimed is:

1. A method of facilitating multi-media communications between a first communicator and a second communicator, the method comprising:
   initiating a communication event over a network between the first communicator, operating a first communications device, and the second communicator, operating a second communications device, via a first communications medium; the network being operatively, electrically coupled with an intermediary computing device;
   transmitting information between said first communications device and said second communications device only on the first communications medium;
   determining that said communications event should transition from the first communications medium to the second communications medium;
   terminating the transmission of information between said first communications device and said second communications device on the first communications medium;
   transitioning said communications event from said first communications medium to a second communications medium, different from said first communications medium, using the intermediary computing device; at least one of the first communications medium or second communications medium being, on its own, a stateless medium; and
   transmitting information between said first communications device and said second communications device only on the second communications medium;
   wherein said intermediary computing device maintains said communications event as a continuous, stateful event over: (i) delays between the transmission of information between the first communications device and the second device; and (ii) the transition between the first communications medium and the second communications medium.

2. The method of claim 1 wherein said first communications medium is a SMS text messaging service.

3. The method of claim 2 wherein said second communications medium is a voice call, e-mail, or facsimile transmission.

4. The method of claim 2, further comprising:
   providing the second communicator with an option to transition said communications event from said first communications media to said second communications medium, prior to the step of transitioning said communications event.

5. The method of claim 2 wherein said information, communicated from said first communicator, is comprised of a request for a voice call at a future time.

6. The method of claim 5 wherein said future time relates to a time that affords a desired rate when using said second communications medium.

7. The method of claim 5 wherein said information, communicated from said first communicator, is comprised of communications contact information for a third communicator to whom said communications event is to be bridged.

8. The method of claim 1 wherein the first communicator is a customer and the second communicator is a merchant, said first communications medium is a voice call and said second communications medium is a text messaging service.

9. The method of claim 8, further comprising:
   transmitting financial data from the first communicator to the second communicator via said second communications medium.

10. The method of claim 9, further comprising:
    bridging said communications event from said second communications medium to said first communications medium after said financial data is transmitted.

11. The method of claim 1 wherein said first communications medium is a voice call and said second communications medium is a voice call, e-mail, or facsimile transmission.

12. The method of claim 11, further comprising:
    determining that a delay in said communications event will be necessary;
    terminating said communications event during said delay;
    reestablishing said communications event via a text messaging service, e-mail, or facsimile transmission to the second communicator at the expiration of said delay;
    providing the second communicator with an option to bridge said communications event from said text messaging service, e-mail, or facsimile transmission to said second communications medium, prior to the step of bridging said communications event.

13. The method of claim 12, further comprising:
    determining when said delay is no greater than a precalculated amount of time, prior to the step of reestablishing said communications event;
    reestablishing said communications event when said delay is less than or equal to said predetermined amount of time.

14. The method of claim 2, further comprising:
    transmitting survey questions to the second communicator, during said communications event, using said first communications medium;
    receiving responses to said survey questions from the second communicator prior to the step of bridging said communications event from said first communications medium to said second communications medium; and
    bridging said communications event from said first communications medium to a service agent, via said second communications medium, only when said responses at least approximate one or more predetermined model responses.

15. The method of claim 1, further comprising:
    transmitting emergency information to the second communicator, during said communications event, using said first communications medium;
    providing the second communicator with an option to bridge said communications event from said first communications medium to said second communications medium, prior to the step of bridging said communications event; and
    bridging said communications event from said first communications medium to said second communications medium, in response to the second communicator accepting the option to bridge said communications event from said first communications medium to said second communications medium.

16. The method of claim 15 wherein said first communications medium is a voice call and said second communications medium is a text messaging service.

17. The method of claim 15 wherein said first communications medium is a text messaging service and said second communications medium is a voice call.

18. The method of claim 1, further comprising:
- transmitting one or more data queries to the second communicator, during said communications event, using said first communications medium;
- receiving data from the second communicator in response to said one or more data queries;
- providing the first communicator with an option to transition said communications event from said first communications medium to said second communications medium, prior to the step of transitioning said communications event;
- transitioning said communications event from said first communications medium to said second communications medium, in response to the first communicator accepting the option to transition said communications event from said first communications medium to said second communications medium; and
- receiving secondary data from the second communicator via said second communications medium.

19. The method of claim 1 wherein said information communicated from the first communicator to the second communicator is comprised of a notice of a recent transaction relating to the second communicator.

20. The method of claim 19, further comprising:
- querying the second communicator, during said communications event via said first communications medium, to determine if said transaction is valid;
- receiving a response from the second communicator regarding said query;
- transitioning said communications event from said first communications medium to said second communications medium, where said response from the second communicator indicates that said transaction is not valid.

21. The method of claim 20 wherein, if said response indicates that said transaction is valid, the second communicator is provided with an option to bridge said communications event from said first communications medium to said second communications medium.

22. The method of claim 20 wherein said communications event is bridged to a service agent via said second communications medium; said second communications medium being a voice call.

23. The method of claim 12 wherein said communications event is bridged to a service agent via said second communications medium; said second communications medium being a voice call.

24. The method of claim 23 wherein identification data is transferred to said service agent, relative to a purpose for said communications event.

25. The method of claim 1 wherein said information relates to a query as to an availability of the second communicator.

26. The method of claim 25, further comprising:
- providing the second communicator with an option to transition said communications event from said first communications medium to said second communications medium, prior to the step of transitioning said communications event; and
- transitioning said communications event from said first communications medium to said second communications medium, in response to the second communicator accepting the option to transition said communications event from said first communications medium to said second communications medium.

27. The method of claim 26 wherein said first communications medium is a text messaging service and said second communications medium is a voice call.

* * * * *